(12) United States Patent
Zeng et al.

(10) Patent No.: US 12,158,801 B2
(45) Date of Patent: Dec. 3, 2024

(54) METHOD OF RESPONDING TO OPERATION, ELECTRONIC DEVICE, AND STORAGE MEDIUM

(71) Applicant: Beijing Baidu Netcom Science Technology Co., Ltd., Beijing (CN)

(72) Inventors: Zhigang Zeng, Beijing (CN); Zhenyuan Sun, Beijing (CN); Bingqing Shao, Beijing (CN); Pengfei Yan, Beijing (CN); Shiyong Li, Beijing (CN); Yanpeng Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 5 days.

(21) Appl. No.: 18/157,429

(22) Filed: Jan. 20, 2023

(65) Prior Publication Data

US 2023/0161664 A1 May 25, 2023

(30) Foreign Application Priority Data

Feb. 28, 2022 (CN) .......................... 202210195107.0

(51) Int. Cl.
*G06F 11/07* (2006.01)
(52) U.S. Cl.
CPC ...... *G06F 11/0793* (2013.01); *G06F 11/0709* (2013.01); *G06F 11/079* (2013.01)
(58) Field of Classification Search
CPC ............ G06F 11/0709; G06F 11/2043; G06F 11/2046; G06F 11/2023
See application file for complete search history.

(56) References Cited

U.S. PATENT DOCUMENTS

| | | | | |
|---|---|---|---|---|
| 8,707,082 | B1* | 4/2014 | Chen ................... | G06F 11/0709 707/790 |
| 10,936,224 | B1* | 3/2021 | Koning ................ | G06F 3/0614 |
| 11,210,187 | B1* | 12/2021 | Gusev ................. | G06F 11/2028 |

(Continued)

FOREIGN PATENT DOCUMENTS

| CN | 103458036 | 12/2013 |
|---|---|---|
| CN | 108881309 | 2/2017 |

(Continued)

OTHER PUBLICATIONS

European Search Report, issued in corresponding European Patent Application No. 23153051.0, dated Aug. 4, 2023, 7 pages.

(Continued)

*Primary Examiner* — Yolanda L Wilson
(74) *Attorney, Agent, or Firm* — HSML P.C.

(57) ABSTRACT

A method of responding to an operation, an electronic device and a storage medium are provided, which relate to a field of cloud computing, and in particular to a field of cluster technology. The specific implementation solution includes: performing, in response to determining that a target operation performed by a target client on a shared resource has timed out, a fault detection on the target client to obtain a fault detection result; and implementing, in response to determining that the fault detection result represents that the target client has a fault, an update operation to obtain a target authority identifier, so that the target client is prevent from continuing to perform the target operation by using the target authority identifier.

17 Claims, 4 Drawing Sheets

200

In response to determining that a target operation performed by a target client on a shared resource has timed out, a fault detection is performed on the target client to obtain a fault detection result — S210

In response to determining that the fault detection result represents that the target client has a fault, an update operation is implemented to obtain a target authority identifier, so that the target client is prevent from continuing to perform the target operation by using the target authority identifier — S220

(56) References Cited

U.S. PATENT DOCUMENTS

| | | | |
|---|---|---|---|
| 11,451,628 B2 | 9/2022 | Zheng | |
| 2014/0149783 A1* | 5/2014 | Georgiev | ............ G06F 11/0793 |
| | | | 714/4.2 |
| 2018/0300199 A1* | 10/2018 | Rathbone | ............ G06F 11/1662 |
| 2021/0211498 A1 | 7/2021 | Zheng | |

FOREIGN PATENT DOCUMENTS

| | | |
|---|---|---|
| CN | 106446300 | 11/2018 |
| EP | 3846419 | 7/2021 |

OTHER PUBLICATIONS

First Chinese Office Action, in the corresponding Chinese patent application No. 202210195107.0, dated Oct. 19, 2022, 13 pages (including machine translation).

\* cited by examiner

METHOD OF RESPONDING TO OPERATION, ELECTRONIC DEVICE, AND STORAGE MEDIUM

CROSS-REFERENCE TO RELATED APPLICATION(S)

This application claims the benefit of Chinese Patent Application No. 202210195107.0 filed on Feb. 28, 2022, the whole disclosure of which is incorporated herein by reference.

TECHNICAL FIELD

The present disclosure relates to a field of cloud computing, in particular to a field of cluster technology. Specifically, the present disclosure relates to a method of responding to an operation, an electronic device and a storage medium.

BACKGROUND

A shared resource is an important part of a cluster system. The shared resource may include a hardware resource, a software resource and a data resource. A user in the cluster system may enjoy some or all of these resources.

With the development of cloud computing technology, the cloud computing technology has been widely used in various fields. For example, the cloud computing technology may be used to share the resource in the cluster system.

SUMMARY

The present disclosure provides a method of responding to an operation, an electronic device and a storage medium.

According to an aspect of the present disclosure, a method of responding to an operation is provided, including:

performing, in response to determining that a target operation performed by a target client on a shared resource has timed out, a fault detection on the target client to obtain a fault detection result; and implementing, in response to determining that the fault detection result represents that the target client has a fault, an update operation to obtain a target authority identifier, so that the target client is prevent from continuing to perform the target operation by using the target authority identifier.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the method according to the present disclosure.

According to another aspect of the present disclosure, a non-transitory computer-readable storage medium having computer instructions stored thereon is provided, wherein the computer instructions are used to cause a computer to implement the method according to the present disclosure.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

A cluster includes several nodes interconnected through a communication network. A user on each node may use a resource on other nodes to share the resource. For example, a device may be shared so that the user may use an external device such as a printer; data may be shared so that the user may access a shared database; a file may be shared so that the user may access a file resource on a shared server.

For resource sharing in the cluster, a node that occupies the shared resource is desired to release the resource in a timely manner, otherwise it tends to lead to a long waiting period for a resource sharing request from other nodes, or resource data is damaged when a plurality of nodes read and write the shared resource at the same time.

To this end, the present disclosure provides a method of responding to an operation. In response to determining that a target operation performed by a target client on a shared resource has timed out, a fault detection is performed on the target client to obtain a fault detection result. In response to determining that the fault detection result represents that the target client has a fault, an update operation is implemented to obtain a target authority identifier, so that the target client is prevent from continuing to perform the target operation by using the target authority identifier. The above process uses the target authority identifier to directly isolate the resource from a failed target client without restarting the target client. Therefore, an efficiency of resource sharing is improved.

In the technical solution of the present disclosure, the collection, storage, use, processing, sending, provision, disclosure and application of the user's personal information involved are all in compliance with the relevant laws and regulations, and necessary confidentiality measures have been taken, and do not violate the public order and good customs.

In the technical solution of the present disclosure, the authorization or consent of the user is acquired before the user's personal information is acquired or collected.

Figure 1:
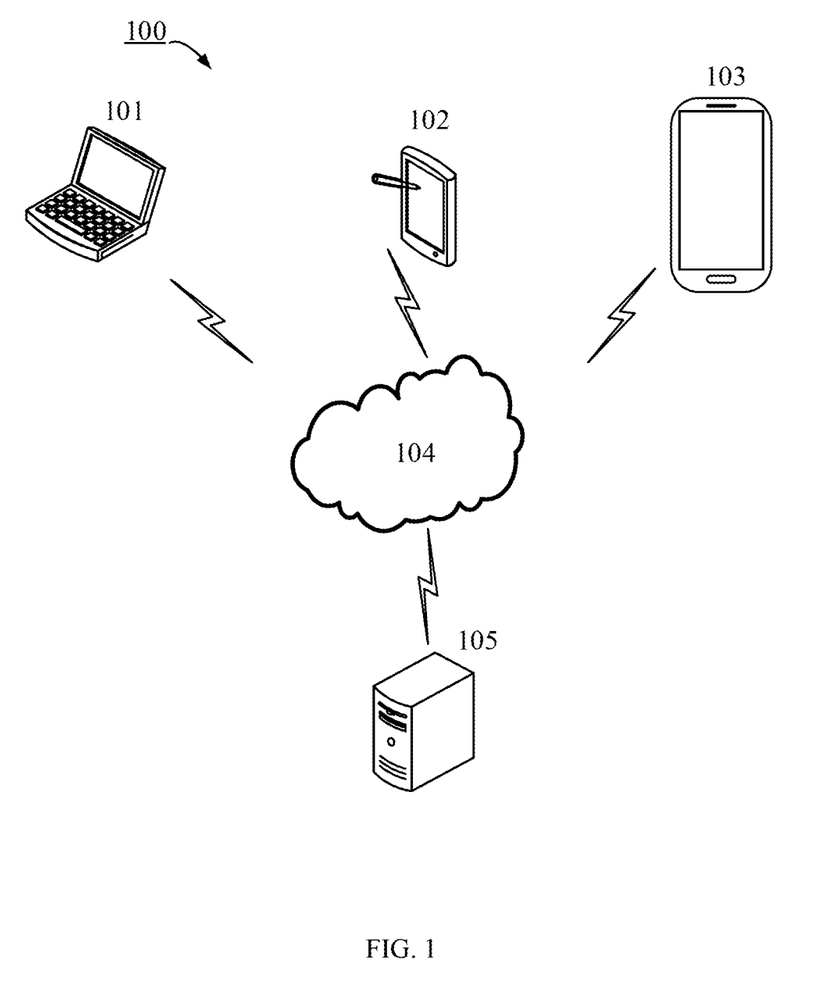
FIG. 1 schematically shows an exemplary system architecture to which a method and an apparatus of responding to an operation may be applied according to an embodiment of the present disclosure.

FIG. 1 schematically shows an exemplary system architecture to which a method and an apparatus of responding to an operation may be applied according to an embodiment of the present disclosure.

It should be noted that FIG. 1 is only an example of a system architecture to which the embodiments of the present disclosure may be applied, so as to help those skilled in the art to understand the technical content of the present disclosure, but it does not mean that the embodiments of the present disclosure cannot be used for other devices, systems, environment or scenes. For example, in another embodiment, the exemplary system architecture to which the method and the apparatus of responding to an operation may be applied may include a terminal device, but the terminal device may implement the method and the apparatus of responding to an operation and apparatus provided by the embodiments of the present disclosure without interacting with a server.

As shown in FIG. 1, a system architecture 100 according to this embodiment may include target clients 101, 102 and 103, a network 104 and a server 105. The network 104 is a medium used to provide a communication link between the target clients 101, 102 and 103 and the server 105. The network 104 may include various connection types, such as a wired and/or wireless communication link, and the like.

A user may use the target clients 101, 102 and 103 to interact with the server 105 through the network 104 to receive or send a massage and the like. Various communication client applications may be installed on the target clients 101, 102 and 103 such as a knowledge reading application, a web browser application, a search application, an instant communication tool, an email client and/or a social platform software, etc. (only examples).

The target clients 101, 102 and 103 may be any electronic device having a display screen and supporting web browsing, including but not limited to a smart phone, a tablet computer, a laptop computer, a desktop computer, and the like.

The server 105 may be a server that provides various services, such as a background management server (just an example) that provides a support for a resource requested by the user using the target clients 101, 102 and 103. The background management server may analyze and process received data such as a user request, and feedback a processing result (such as a web page, information, or data obtained or generated according to the user request) to the terminal device. The server 105 may further include a data node. The data node provides, for example, a block service and may manage a local data resource.

It should be noted that the method of responding to the operation provided by the embodiments of the present disclosure may generally be executed by the server 105. Accordingly, the apparatus of responding to the operation provided by the embodiments of the present disclosure may also be disposed in the server 105. The method of responding to the operation provided by the embodiments of the present disclosure may also be executed by a server or a server cluster different from the server 105 and capable of communicating with the target clients 101, 102 and 103 and/or the server 105. Accordingly, the apparatus of responding to the operation provided by the embodiments of the present disclosure may also be disposed in the server or the server cluster different from the server 105 and capable of communicating with the target clients 101, 102 and 103 and/or the server 105.

For example, in response to determining that a target operation performed by the target clients 101, 102 and 103 on a shared resource has timed out, the server 105 may perform a fault detection on the target clients 101, 102 and 103 to obtain a fault detection result. In response to determining that the fault detection result represents that the target clients 101, 102 and 103 have a fault, the server 105 may implement an update operation to obtain a target authority identifier, so that the target clients 101, 102 and 103 are prevent from continuing to perform the target operation by using the target authority identifier.

According to an embodiment of the present disclosure, the system architecture 100 may further include a fence module and a lock module.

The fence module may include a fence server and a fence client. The lock module may include a lock server and a lock client. A resource authority requester composed of the fence client and the lock client may be located in the target clients 101, 102, and 103 of the cluster. A resource manager composed of the fence server and the lock server may be located in the server 105.

For example, when the user initiates a writing operation request by using the target clients 101, 102 and 103, a corresponding lock authority and a fence version may be applied from the server 105 through the resource authority requester. After acquiring an access authority for the resource, a writing request may be initiated to the server 105. The server 105 may detect whether a fence version requested by a IO (Input/Output) of the target client is consistent with a version stored locally. If the fence version requested by the IO of the target client is consistent with the version stored locally, the writing request may be allowed. If the fence version requested by the IO of the target client is inconsistent with the version stored locally, the writing request may be rejected.

It should be understood that the numbers of target clients, network and server in FIG. 1 are merely illustrative. There may be any number of target clients, networks and servers as desired in practice.

It should be noted that a sequence number of each operation in the following method is only used as a representation of the operation for the convenience of description, and should not be regarded as representing an execution order of the respective operation. The method is not desired to be performed in the exact order shown unless explicitly stated.

Figure 2:
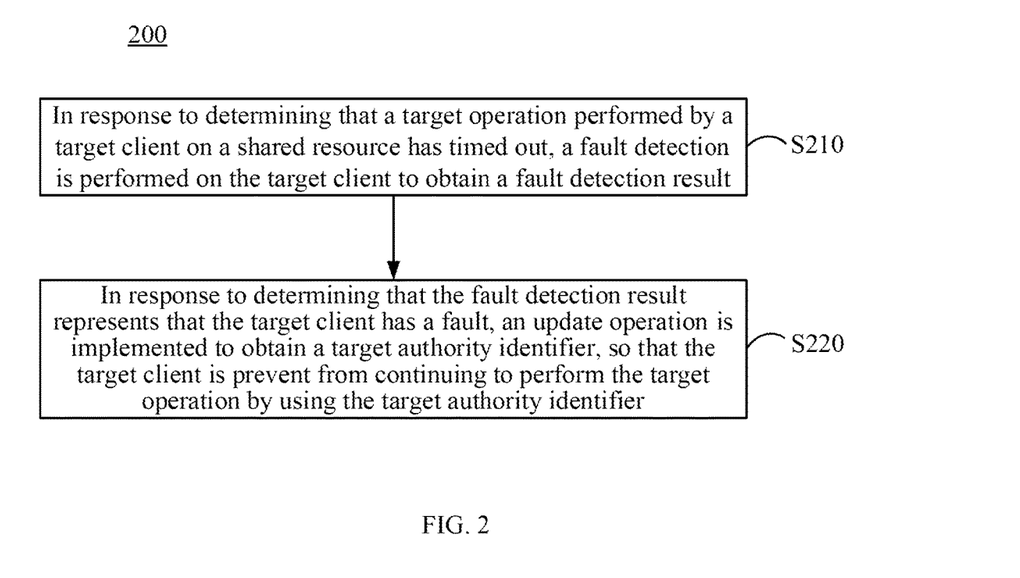
FIG. 2 schematically shows a flowchart of a method of responding to an operation according to an embodiment of the present disclosure.

FIG. 2 schematically shows a flowchart of a method of responding to an operation according to an embodiment of the present disclosure.

As shown in FIG. 2, the method includes operations S210 to S220.

In operation S210, in response to determining that a target operation performed by a target client on a shared resource has timed out, a fault detection is performed on the target client to obtain a fault detection result.

In operation S220, in response to determining that the fault detection result represents that the target client has a fault, an update operation is implemented to obtain a target authority identifier, so that the target client is prevent from continuing to perform the target operation by using the target authority identifier.

According to an embodiment of the present disclosure, the cluster may include a plurality of terminal devices. Each terminal device may be called as the node. The nodes may be connected to each other through LAN. WAN or other ways. The target client may include the node in the cluster. The cluster may include a high-performance computing cluster, a load balancing cluster, and a highly available cluster.

According to an embodiment of the present disclosure, the shared resource may include a hardware resource, a software resource and a data resource. The server in the cluster may monitor an access state information of each shared resource and a duration information of the target operation executed on the shared resource in real time. The server in the cluster may determine, based on the access state information, a state of each shared resource indicating whether the target operation (such as the writing operation) is executed to the shared resource by the target client at a moment. The server in the cluster may determine whether the target operation performed by the target client on the shared resource has timed out based on the duration information of the target operation executed.

According to an embodiment of the present disclosure, the target operation may include a reading operation for the shared resource and a writing operation for the shared resource.

According to an embodiment of the present disclosure, when it is determined that the target operation performed by the target client on the shared resource has timed out, a heartbeat detection request may be periodically sent to the target client, so as to determine whether the target client has a fault according to a response to the heartbeat detection request, thereby obtaining the fault detection result. For example, the heartbeat detection request may be sent to the target client every 1 second. If no response heartbeat is received from the target client for n consecutive times (for example, 5 times), the target client is considered to have a fault. It should be noted that in addition to a fault detection method of sending the heartbeat detection request to the target client, other fault detection methods may also be used, which will not be repeated here.

According to an embodiment of the present disclosure, in response to determining that the fault detection result represents that the target client has a fault, the server may implement an update operation on the authority identifier, and prevent the target client from continuing to perform the target operation by using the obtained target authority identifier.

According to an embodiment of the present disclosure, the update operation may refer to updating the authority identifier. The authority identifier may be used to represent an identifier having an authority to access the shared resource. A type of the authority identifier is not limited, for example, the type of the authority identifier may be a number, but not limited to it. The type of the authority identifier may also be a QR code or a barcode.

According to an embodiment of the present disclosure, in response to determining that the fault detection result represents that the target client has a fault, an update operation may be implemented on the authority identifier to obtain the target authority identifier. In this case, after the failure is removed from the failed target client, the target client will not be able to access the shared resource with a non-updated authority identifier. Therefore, the target authority identifier may be used to prevent the target client from continuing to perform the target operation.

According to another embodiment of the present disclosure, if the target client in the cluster fails, the cluster may remove the target client. Such removing operation may be called as a fence mechanism or a STONITH (shoot the other node in the head) mechanism. For example, a proprietary network channel is used to forcibly restart the client.

According to an embodiment of the present disclosure, in response to determining that a target operation performed by a target client on a shared resource has timed out, a fault detection is performed on the target client to obtain a fault detection result. In response to determining that the fault detection result represents that the target client has a fault, an update operation is implemented to obtain a target authority identifier. Through the above technical means, the target authority identifier may be used to prevent the failed target client from accessing the shared resource, thus achieving an effect of resource isolation. Compared with using the proprietary network channel to forcibly restart the target client to prevent the target client from continuing to perform target operation, the method of responding to an operation provided in the present disclosure may use the target authority identifier to perform the resource isolation, so that the resource isolation may be achieved simply and efficiently.

Figure 3:
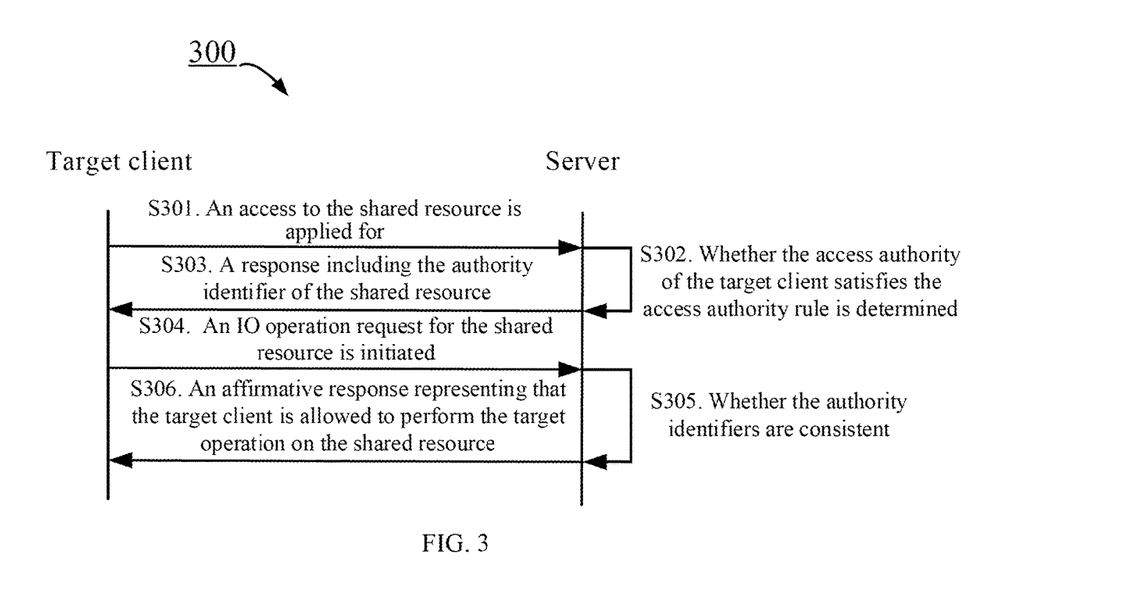
FIG. 3 schematically shows a working timing diagram of a normal access situation according to an embodiment of the present disclosure.
Figure 4:
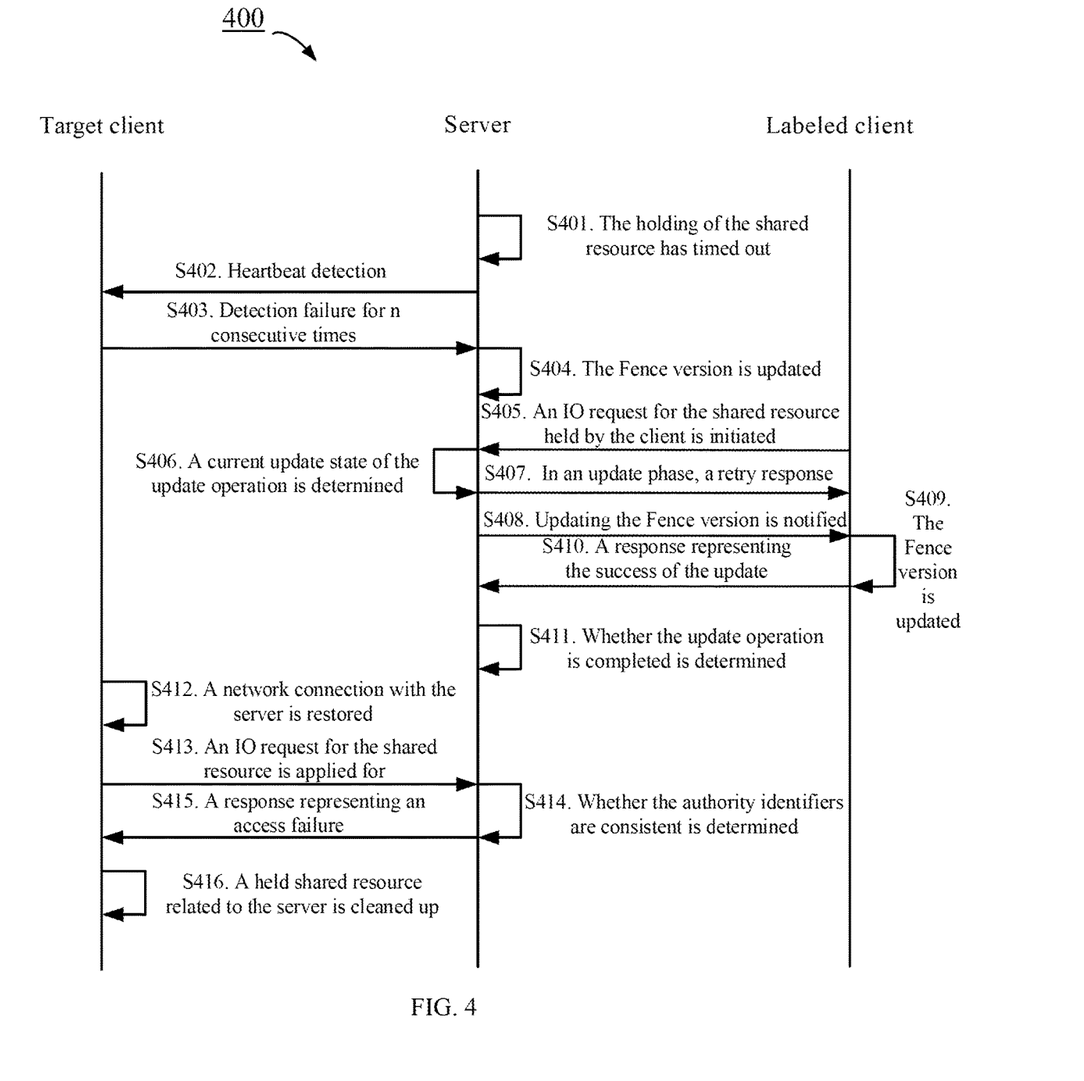
FIG. 4 schematically shows a working timing diagram of an abnormal access situation according to an embodiment of the present disclosure.

With reference to FIGS. 3 and 4, the method shown in FIG. 2, for example, will be further described with specific embodiments as examples.

According to an embodiment of the present disclosure, before performing, in response to determining that the target operation performed by the target client on the shared resource has timed out, the fault detection on the target client to obtain the fault detection result, the method of responding to the operation may further include the following operations.

An access authority of the target client is determined in response to receiving an access request from the target client. An authority identifier is sent to the target client in response to determining that the access authority of the target client satisfies an access authority rule.

According to an embodiment of the present disclosure, the authority identifier may include a fence version number. When the target client in the cluster initiates an access to the shared resource of the server, the server may generate a fence version number for the target client. The fence version number may be expressed as Ver(f). This fence version number increases monotonously and may be stored permanently. This fence version number may protect an effective access of the target client to the shared resource.

According to an embodiment of the present disclosure, the access authority rule may include: if the target client has an authority identifier, the access authority is not satisfied; if the target client doesn't have an authority identifier, the access authority is satisfied. When it is determined that the access authority of the target client satisfies the access authority rule, it may indicate that the target client does not have the authority identifier, and the server may send the authority identifier to the target client.

According to an embodiment of the present disclosure, the above-mentioned method of responding to the operation may further include the following operations.

The authority identifier of the target client is determined in response to receiving a request for implementing the target operation from the target client. The target client is allowed to implement the target operation on the shared resource in response to determining that the authority identifier is consistent with a pre-determined authority identifier. The target client is denied from implementing the target operation on the shared resource in response to determining that the authority identifier is inconsistent with the pre-determined authority identifier.

According to an embodiment of the present disclosure, the pre-determined authority identifier may include a fence version number of the server for the shared resource.

According to an embodiment of the present disclosure, allowing the target client to implement the target operation on the shared resource in response to determining that the authority identifier is consistent with the pre-determined authority identifier may include the following operations.

An access state of the shared resource is determined in response to determining that the authority identifier is consistent with the pre-determined authority identifier, wherein the access state represents whether another client is implementing the target operation on the shared resource or not. The target client is allowed to implement the target operation on the shared resource in response to determining that the access state of the shared resource satisfies an access state rule.

According to an embodiment of the present disclosure, the access authority rule may include: in a case that the shared resource is occupied by other clients, there is no access authority; in a case that the shared resource is not occupied by other clients, there is the access authority. The shared resource occupied by other clients may refer to that other clients are performing a target operation of reading on the shared resource, but not limited to this. The shared resource occupied by other clients may also refer to that other clients are performing a target operation of writing on the shared resource.

FIG. 3 schematically shows a working timing diagram of a normal access situation according to an embodiment of the present disclosure.

As shown in operations S301 to S303 in FIG. 3, in operation S301, the target client may send a request for access to the shared resource to the server, such as applying for the access to the shared resource. In operation S302, a resource manager on the server may determine whether the access authority of the target client satisfies the access authority rule based on the access request. When it is determined that the access authority of the target client satisfies the access authority rule, an operation S303 is executed. In operation S303, the shared resource may be read by the target client, that is, a response including the authority identifier of the shared resource may be sent to the target client.

As shown in operations S304 to S306 in FIG. 3, in operation S304, the target client may initiate an IO operation request for the shared resource. The IO operation request may include the authority identifier. In operation S305, after receiving the IO request from the target client, the server may determine whether the authority identifier carried by the target client is consistent with a local predetermined authority identifier. In operation S306, when it is determined that the authority identifier is consistent with the predetermined authority identifier, the server may send an affirmative response representing that the target client is allowed to perform the target operation on the shared resource. When it is determined that the authority identifier is inconsistent with the predetermined authority identifier, the server may reject the target client to perform the target operation on the shared resource.

According to an embodiment of the present disclosure, when it is determined that the access authority of the target client satisfies the access authority rule, the authority identifier is sent to the target client, and it is determined whether the target client is allowed to perform the target operation on the shared resource according to whether the authority identifier is consistent with the predetermined authority identifier. Through the above technical means, the security and consistency of the shared resource may be guaranteed.

FIG. 4 schematically shows a working timing diagram of an abnormal access situation according to an embodiment of the present disclosure.

As shown in operations S401 to S404 in FIG. 4, in operation S401, it is determined that the target operation performed by the target client on the shared resource has timed out, that is, the shared resource has not received the request from the target client for a period of time. In operation S402, the resource manager on the server may initiate the heartbeat detection to the target client. In operation S403, after receiving more than n heartbeat detection failure results, it is determined that the target client has a fault. In operation S404, the server may update the fence version number of this node to obtain the target authority identifier, and persistently store the updated target authority identifier as a current valid version number.

According to an embodiment of the present disclosure, when it is determined that a holding of the target client for the shared resource has timed out and the target client has a fault, an update operation may be performed on the authority identifier. The authority identifier of the target client before the update may be expressed as Ver(f). The updated target authority identifier may be expressed as Ver(f+1).

According to an embodiment of the present disclosure, the server may maintain a local fence version number. When the target client has a fault due to network interruption or other reasons, the server may initiate the update operation of the fence version number to complete an update process of the authority identifier.

As shown in operations S405 to S407 in FIG. 4, in operation S405, a labeled client may initiate an IO request for a certain shared resource held by the client. In operation S406, the resource manager on the server may determine a current update state of the update operation. In operation S407, if the current update state is in an update phase, a retry response may be sent to the labeled client.

As shown in operations S408 to S411 in FIG. 4, in operation S408, the labeled client may be notified to update the fence version number according to an effective resource table maintained by the server. In operation S409, the labeled client may update the fence version number locally. In operation S410, after obtaining the updated target authority identifier, the labeled client may send a response representing the success of the update to the server. In operation S411, the server may determine whether the update operation is completed based on the response representing the success of the update.

According to an embodiment of the present disclosure, a current update state of the update operation is determined in response to receiving a request for implementing the target operation from the labeled client. A retry response representing retry is sent to the labeled client in response to determining that the current update state is in an update phase.

According to an embodiment of the present disclosure, in the update phase, that is, after it is determined that the fence version number has expired and before the labeled client completes the update operation for the fence version number, an access operation to the shared resource initiated by the labeled client may be determined as the retry.

According to an embodiment of the present disclosure, when the target client is isolated, the server may update the fence version number and store the updated fence version number persistently. After the server restarts, the server is desired to load the persistent fence version number Ver(f+1) to provide a service to the labeled client.

According to an embodiment of the present disclosure, after performing, in response to determining that the fault detection result represents that the target client has the fault, the update operation to obtain the target authority identifier, the method may further include the following operations.

For example, a labeled client is determined. The labeled client includes a client other than the target client in a plurality of accessed clients during a historical period. The target authority identifier is sent to the labeled client.

According to an embodiment of the present disclosure, by updating the fence version number of the server and the fence version number of the labeled client, whether the IO request of the labeled client for the held shared resource is successful may be determined according to the target authority identifier. A problem that the shared resource is occupied by the failed target client for a long time, which causes other clients fail to run normally, may be avoided, thus improving an utilization efficiency of the shared resource in the cluster and a performance of the system.

As shown in operations S412 to S416 in FIG. 4, in operation S412, when a network connection between the target client and the server is restored, that is, when the target client removes the fault and rejoins the cluster, the target client may consider that access authority for the shared resource of the server is effective. In operation S413, the target client may send another IO request for the shared resource to the server. In operation S414, the server may determine whether the authority identifier of the target client is consistent with the target authority identifier. If the authority identifier of the target client is inconsistent with the target authority identifier, the server may reject the IO request of the target client, and the server may notify a local resource manager to cancel a holding record of the target client for the shared resource. In operation S415, the server may send a response representing an access failure to the target client. In operation S416, the target client may clean up its own shared resource related to the server after receiving the response.

According to an embodiment of the present disclosure, after performing, in response to determining that the fault detection result represents that the target client has the fault, the update operation to obtain the target authority identifier, the method may further include the following operations.

For example, an authority identifier of the target client is determined in response to receiving a request for implementing the target operation from the target client. In response to determining that the authority identifier is inconsistent with the target authority identifier, a negative response representing that the request fails is sent to the target client, so that the target client deletes an operated shared resource based on the negative response.

According to an embodiment of the present disclosure, when the fence version number in the IO request of the target client is inconsistent with the fence version number of the server, the server may reject the access request of the target client.

According to an embodiment of the present disclosure, an access to the shared resource by the isolated target client may be prevented by the authority identifier, so as to clean up an expired shared resource of the failed target client and avoid the same shared resource being occupied by a plurality of clients. Only one client performing the writing operation at the same time may be ensured, which may effectively improve the performance and stability of the cluster.

Figure 5:
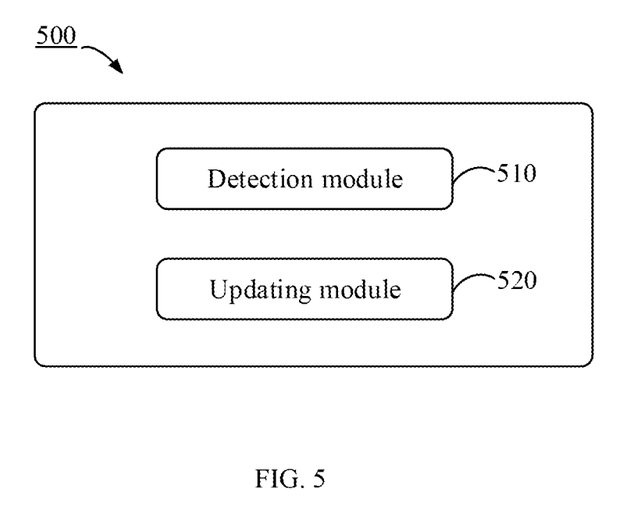
FIG. 5 schematically shows a block diagram of an apparatus of responding to an operation according to an embodiment of the present disclosure.

FIG. 5 schematically shows a block diagram of an apparatus of responding to an operation according to an embodiment of the present disclosure.

As shown in FIG. 5, an apparatus 500 of responding to an operation may include a detection module 510 and an updating module 520.

The detection module 510 is used to perform, in response to determining that a target operation performed by a target client on a shared resource has timed out, a fault detection on the target client to obtain a fault detection result.

The updating module 520 is used to implement, in response to determining that the fault detection result represents that the target client has a fault, an update operation to obtain a target authority identifier, so that the target client is prevent from continuing to perform the target operation by using the target authority identifier.

According to an embodiment of the present disclosure, the apparatus 500 of responding to an operation may further include a first determination module and a first sending module.

The first determination module is used to determine an authority identifier of the target client in response to receiving a request for implementing the target operation from the target client.

The first sending module is used to send, in response to determining that the authority identifier is inconsistent with the target authority identifier, a negative response representing that the request fails to the target client, so that the target client deletes an operated shared resource based on the negative response.

According to an embodiment of the present disclosure, the apparatus 500 of responding to an operation may further include a second determination module and a second sending module.

The second determination module is used to determine a labeled client, wherein the labeled client includes a client other than the target client in a plurality of accessed clients during a historical period.

The second sending module is used to send the target authority identifier to the labeled client.

According to an embodiment of the present disclosure, the apparatus 500 of responding to an operation may further include a third determination module and a third sending module.

The third determination module is used to determine a current update state of the update operation in response to receiving a request for implementing the target operation from the labeled client.

The third sending module is used to send a retry response representing retry to the labeled client in response to determining that the current update state is in an update phase.

According to an embodiment of the present disclosure, the apparatus 500 of responding to an operation may further include a fourth determination module and a fourth sending module.

The fourth determination module is used to determine an access authority of the target client in response to receiving an access request from the target client.

The fourth sending module is used to send an authority identifier to the target client in response to determining that the access authority of the target client satisfies an access authority rule.

According to an embodiment of the present disclosure, the apparatus 500 of responding to an operation may further include a fifth determination module, a first processing module and a second processing module.

The fifth determination module is used to determine the authority identifier of the target client in response to receiving a request for implementing the target operation from the target client.

The first processing module is used to allow the target client to implement the target operation on the shared resource in response to determining that the authority identifier is consistent with a pre-determined authority identifier.

The second processing module is used to deny the target client from implementing the target operation on the shared resource in response to determining that the authority identifier is inconsistent with the pre-determined authority identifier.

According to an embodiment of the present disclosure, the first processing module includes a determination unit and a processing unit.

The determination unit is used to determine an access state of the shared resource in response to determining that the authority identifier is consistent with the pre-determined authority identifier, wherein the access state represents whether another client is implementing the target operation on the shared resource or not.

The processing unit is used to allow the target client to implement the target operation on the shared resource in response to determining that the access state of the shared resource satisfies an access state rule.

According to an embodiment of the present disclosure, the present disclosure further provides an electronic device, a readable storage medium, and a computer program product.

According to an embodiment of the present disclosure, the electronic device includes at least one processor; and a memory communicatively connected to the at least one processor, wherein the memory stores instructions executable by the at least one processor, and the instructions, when executed by the at least one processor, cause the at least one processor to implement the method as an embodiment of the present disclosure.

According to an embodiment of the present disclosure, a non-transitory computer-readable storage medium having computer instructions stored thereon is provided, wherein the computer instructions are used to cause a computer to implement the method as an embodiment of the present disclosure.

According to an embodiment of the present disclosure, a computer program product containing a computer program is provided, wherein the computer program, when executed by a processor, causes the processor to implement the method as an embodiment of the present disclosure.

Figure 6:
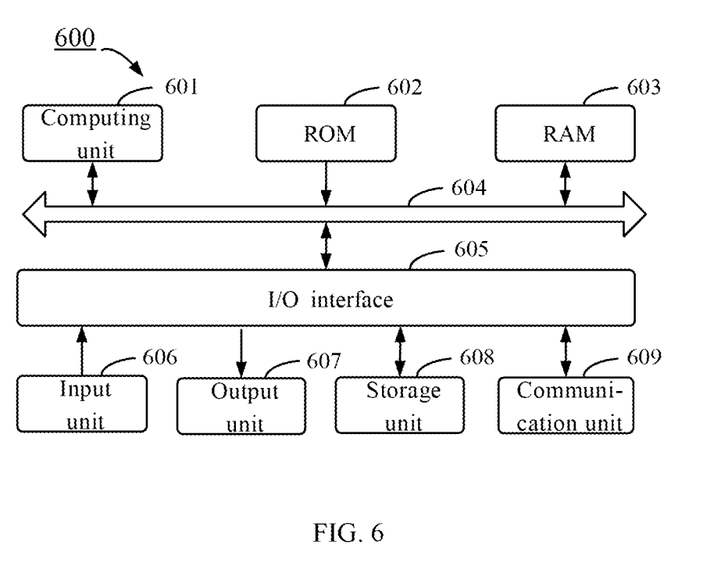
FIG. 6 schematically shows a block diagram of an electronic device suitable for implementing a method of responding to an operation according to an embodiment of the present disclosure.

FIG. 6 shows a schematic block diagram of an exemplary electronic device 600 for implementing the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the device 600 may include a computing unit 601, which may perform various appropriate actions and processing based on a computer program stored in a read-only memory (ROM) 602 or a computer program loaded from a storage unit 608 into a random access memory (RAM) 603. Various programs and data required for the operation of the device 600 may be stored in the RAM 603. The computing unit 601, the ROM 602 and the RAM 603 are connected to each other through a bus 604. An input/output (I/O) interface 605 is further connected to the bus 604.

Various components in the device 600, including an input unit 606 such as a keyboard, a mouse, etc., an output unit 607 such as various types of displays, speakers, etc., a storage unit 608 such as a magnetic disk, an optical disk, etc., and a communication unit 609 such as a network card, a modem, a wireless communication transceiver, etc., are connected to the I/O interface 605. The communication unit 609 allows the device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 601 may perform the various methods and processes described above, such as the method of responding to an operation. For example, in some embodiments, the method of responding to an operation may be implemented as a computer software program that is tangibly contained on a machine-readable medium, such as a storage unit 608. In some embodiments, part or all of a computer program may be loaded and/or installed on the device 600 via the ROM 602 and/or the communication unit 609. When the computer program is loaded into the RAM 603 and executed by the computing unit 601, one or more steps of the method of responding to an operation described above may be performed. Alternatively, in other embodiments, the computing unit 601 may be configured to perform the method of responding to an operation in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may send the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middle-ware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding to computers and having a client-server relationship with each other. The server may be a cloud server, a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of responding to an operation, comprising:
    performing, in response to determining that a target operation performed by a target client on a shared resource has timed out, a fault detection on the target client to obtain a fault detection result;
    implementing, in response to determining that the fault detection result represents that the target client has a fault, an update operation to obtain a target authority identifier, so that the target client is prevented from continuing to perform the target operation by using the target authority identifier;
    determining an authority identifier of the target client in response to receiving a request for implementing the target operation from the target client; and
    sending, in response to determining that the authority identifier is inconsistent with the target authority identifier, a negative response representing that the request fails to the target client, so that the target client deletes an operated shared resource based on the negative response.

2. The method according to claim 1, further comprising, after performing, in response to determining that the fault detection result represents that the target client has the fault, the update operation to obtain the target authority identifier:
    determining a labeled client, wherein the labeled client comprises a client other than the target client in a plurality of accessed clients during a historical period; and
    sending the target authority identifier to the labeled client.

3. The method according to claim 2, further comprising:
    determining a current update state of the update operation in response to receiving a request for implementing the target operation from the labeled client; and
    sending a retry response representing retry to the labeled client in response to determining that the current update state is in an update phase.

4. The method according to claim 1, further comprising, before performing, in response to determining that the target operation performed by the target client on the shared resource has timed out, the fault detection on the target client to obtain the fault detection result:
    determining an access authority of the target client in response to receiving an access request from the target client; and
    sending an authority identifier to the target client in response to determining that the access authority of the target client satisfies an access authority rule.

5. The method according to claim 4, further comprising:
    determining the authority identifier of the target client in response to receiving a request for implementing the target operation from the target client;
    allowing the target client to implement the target operation on the shared resource in response to determining that the authority identifier is consistent with a predetermined authority identifier; and
    denying the target client from implementing the target operation on the shared resource in response to determining that the authority identifier is inconsistent with the pre-determined authority identifier.

6. The method according to claim 5, wherein allowing the target client to implement the target operation on the shared resource in response to determining that the authority identifier is consistent with the pre-determined authority identifier comprises:
   determining an access state of the shared resource in response to determining that the authority identifier is consistent with the pre-determined authority identifier, wherein the access state represents whether another client is implementing the target operation on the shared resource or not; and
   allowing the target client to implement the target operation on the shared resource in response to determining that the access state of the shared resource satisfies an access state rule.

7. An electronic device, comprising:
   at least one processor; and
   a memory communicatively connected to the at least one processor, wherein the memory stores instructions executable by the at least one processor, and the instructions, when executed by the at least one processor, cause the at least one processor to:
   perform, in response to determining that a target operation performed by a target client on a shared resource has timed out, a fault detection on the target client to obtain a fault detection result;
   implement, in response to determining that the fault detection result represents that the target client has a fault, an update operation to obtain a target authority identifier, so that the target client is prevented from continuing to perform the target operation by using the target authority identifier;
   determine an authority identifier of the target client in response to receiving a request for implementing the target operation from the target client; and
   send, in response to determining that the authority identifier is inconsistent with the target authority identifier, a negative response representing that the request fails to the target client, so that the target client deletes an operated shared resource based on the negative response.

8. The electronic device according to claim 7, wherein after performing, in response to determining that the fault detection result represents that the target client has the fault, the update operation to obtain the target authority identifier, the at least one processor is further configured to:
   determine a labeled client, wherein the labeled client comprises a client other than the target client in a plurality of accessed clients during a historical period; and
   send the target authority identifier to the labeled client.

9. The electronic device according to claim 8, wherein the at least one processor is further configured to:
   determine a current update state of the update operation in response to receiving a request for implementing the target operation from the labeled client; and
   send a retry response representing retry to the labeled client in response to determining that the current update state is in an update phase.

10. The electronic device according to claim 7, wherein before performing, in response to determining that the target operation performed by the target client on the shared resource has timed out, the fault detection on the target client to obtain the fault detection result, the at least one processor is further configured to:
    determine an access authority of the target client in response to receiving an access request from the target client; and
    send an authority identifier to the target client in response to determining that the access authority of the target client satisfies an access authority rule.

11. The electronic device according to claim 10, wherein the at least one processor is further configured to:
    determine the authority identifier of the target client in response to receiving a request for implementing the target operation from the target client;
    allow the target client to implement the target operation on the shared resource in response to determining that the authority identifier is consistent with a pre-determined authority identifier; and
    deny the target client from implementing the target operation on the shared resource in response to determining that the authority identifier is inconsistent with the pre-determined authority identifier.

12. The electronic device according to claim 11, wherein the at least one processor is further configured to:
    determine an access state of the shared resource in response to determining that the authority identifier is consistent with the pre-determined authority identifier, wherein the access state represents whether another client is implementing the target operation on the shared resource or not; and
    allow the target client to implement the target operation on the shared resource in response to determining that the access state of the shared resource satisfies an access state rule.

13. A non-transitory computer-readable storage medium having computer instructions stored thereon, wherein the computer instructions are configured to cause a computer to:
    perform, in response to determining that a target operation performed by a target client on a shared resource has timed out, a fault detection on the target client to obtain a fault detection result;
    implement, in response to determining that the fault detection result represents that the target client has a fault, an update operation to obtain a target authority identifier, so that the target client is prevented from continuing to perform the target operation by using the target authority identifier;
    determine an authority identifier of the target client in response to receiving a request for implementing the target operation from the target client; and
    send, in response to determining that the authority identifier is inconsistent with the target authority identifier, a negative response representing that the request fails to the target client, so that the target client deletes an operated shared resource based on the negative response.

14. The non-transitory computer-readable storage medium according to claim 13, wherein after performing, in response to determining that the fault detection result represents that the target client has the fault, the update operation to obtain the target authority identifier, the computer instructions are further configured to cause the computer to:
    determine a labeled client, wherein the labeled client comprises a client other than the target client in a plurality of accessed clients during a historical period; and
    send the target authority identifier to the labeled client.

15. The non-transitory computer-readable storage medium according to claim 14, wherein the computer instructions are further configured to cause the computer to:

determine a current update state of the update operation in response to receiving a request for implementing the target operation from the labeled client; and send a retry response representing retry to the labeled client in response to determining that the current update state is in an update phase.

16. The non-transitory computer-readable storage medium according to claim 13, wherein before performing, in response to determining that the target operation performed by the target client on the shared resource has timed out, the fault detection on the target client to obtain the fault detection result, the computer instructions are further configured to cause the computer to:

determine an access authority of the target client in response to receiving an access request from the target client; and send an authority identifier to the target client in response to determining that the access authority of the target client satisfies an access authority rule.

17. The non-transitory computer-readable storage medium according to claim 16, wherein the computer instructions are further configured to cause the computer to:

determine the authority identifier of the target client in response to receiving a request for implementing the target operation from the target client;

allow the target client to implement the target operation on the shared resource in response to determining that the authority identifier is consistent with a pre-determined authority identifier; and deny the target client from implementing the target operation on the shared resource in response to determining that the authority identifier is inconsistent with the pre-determined authority identifier.

* * * * *